United States Patent
Lin et al.

(10) Patent No.: US 11,483,204 B2
(45) Date of Patent: Oct. 25, 2022

(54) COMPRESSED TABLE-BASED CONFIGURATION OF REMAINING MINIMUM SYSTEM INFORMATION CORESET IN A NEW RADIO PHYSICAL BROADCAST CHANNEL

(71) Applicant: Telefonaktiebolaget LM Ericsson (publ), Stockholm (SE)

(72) Inventors: Zhipeng Lin, Nanjing (CN); Henrik Sahlin, Mölnlycke (SE); Asbjörn Grövlen, Stockholm (SE); Jingya Li, Gothenburg (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 161 days.

(21) Appl. No.: 16/754,834

(22) PCT Filed: Nov. 15, 2018

(86) PCT No.: PCT/SE2018/051179
§ 371 (c)(1),
(2) Date: Apr. 9, 2020

(87) PCT Pub. No.: WO2019/098927
PCT Pub. Date: May 23, 2019

(65) Prior Publication Data
US 2020/0244530 A1 Jul. 30, 2020

Related U.S. Application Data

(60) Provisional application No. 62/587,808, filed on Nov. 17, 2017.

(51) Int. Cl.
*H04L 41/0866* (2022.01)
*H04L 5/00* (2006.01)
(Continued)

(52) U.S. Cl.
CPC ........ *H04L 41/0866* (2013.01); *H04L 5/0007* (2013.01); *H04L 5/0048* (2013.01);
(Continued)

(58) Field of Classification Search
CPC . H04L 41/0866; H04L 5/0007; H04L 5/0048; H04L 27/2602; H04L 5/0053;
(Continued)

(56) References Cited

U.S. PATENT DOCUMENTS

| 2018/0167946 A1* | 6/2018 | Si | H04L 5/00 |
| 2018/0192383 A1* | 7/2018 | Nam | H04L 5/0044 |
| 2019/0356524 A1* | 11/2019 | Yi | H04B 7/0617 |

FOREIGN PATENT DOCUMENTS

WO    2015041487 A1    3/2015

OTHER PUBLICATIONS

First Examination Report for Indian Patent Application No. 202047016561 dated Sep. 8, 2021, 6 pages.
(Continued)

*Primary Examiner* — Kyaw Z Soe
(74) *Attorney, Agent, or Firm* — Sage Patent Group

(57) ABSTRACT

A method, system and apparatus for reducing a number of bits of a physical broadcast channel (PBCH) used to broadcast a configuration of a remaining minimum system information (RMSI) data set as compared with other arrangements are disclosed. According to one aspect, a method in a network node includes determining a remaining minimum system information (RMSI) configuration based on a table of assumptions used to determine a number of bits to represent the RMSI configuration and broadcasting the RMSI configuration using the determined number of bits via a physical broadcast channel (PBCH).

20 Claims, 11 Drawing Sheets

(51) Int. Cl.
  *H04W 48/12* (2009.01)
  *H04W 56/00* (2009.01)
  *H04W 72/12* (2009.01)

(52) U.S. Cl.
  CPC ......... *H04W 48/12* (2013.01); *H04W 56/001* (2013.01); *H04W 72/1289* (2013.01)

(58) Field of Classification Search
  CPC ...... H04L 5/0051; H04L 27/26; H04W 48/12; H04W 56/001; H04W 72/1289
  See application file for complete search history.

(56) References Cited

OTHER PUBLICATIONS

PCT International Search Report and Written Opinion dated Mar. 26, 2019 for International Application No. PCT/SE2018/051179, 14 pages.
Qualcomm Incorporated: "Remaining system information delivery consideration"; 3GPP TSG-RAN WG1 #88 R1-1702590; Feb. 13-17, 2017; Athens, Greece; Agenda item: 8.1.1.2.2; 3 pages.
InterDigital Inc.: "On NR Physical Broadcast Channel"; 3GPP TSG-RAN WG1 NR AH#2; R1-1710916; Qingado, P.R. China, Jun. 27-30, 2017; Agenda item: 5.1.1.2.1; 6 pages.
Ericsson: "NR delivery of remaining minimum system information"; 3GPP TSG-RAN WG1 Ad-Hoc#2; R1-1711377; Qingado, P.R. China, Jun. 27-30, 2017; Agenda item: 5.1.1.2.4; 5 pages.
Extended European Search Report for European Patent Application No. 18879831.8 dated Jul. 12, 2021, 10 pages.
NTT DOCOMO,Inc., 3GPP TSG RAN WG1 Meeting 90bis, R1-1718181 "Discussion on Remaining Details on RMSI Delivery", Prague, CZ , Oct. 9-13, 2017, XP051341363, 7 pages.
CATT, 3GPP TSG RAN WG1 Meeting 90bis, R1-1719145, Updated from R1-1719033, "Offline Summary for AI 7.1.2.2 Remaining Details on Remaining Minimum System Information", Prague, CZ , Oct. 9-13, 2017, XP051353581, 15 pages.
CATT, 3GPP TSG RAN WG1 Meeting 90bis, R1-1719198 Updated from R1-1719145, "Offline Summary for AI 7.1.2.2 Remaining Details on Remaining Minimum System Information", Prague, CZ , Oct. 9-13, 2017, XP051353661, 15 pages.
Nokia et al., 3GPP TSG-RAN WG1 NR AH#3, R1-1718613, "Remaining Details on Remaining Minimum System Information", Prague, CZ, Oct. 9-13, 2017, XP051341787, 9 pages.
Zte et al., 3GPP TSG RAN WG1 Meeting #90bis, R1-1717032, "Remaining Details of RMSI", Prague, CZ, Oct. 9-13, 2017, XP051352443, 12 pages.
Potevio, 3GPP TSG RAN WG1 Meeting 91, R1-1720376, "Remaining Details on Remaining Minimum System Information Delivery", Reno, USA, Nov. 27-Dec. 1, 2017, XP051368983, 4 pages.
Huawei et al., 3GPP TSG RAN WG1 Meeting #93, R1-1805873, "Remaining Details on RMSI Configurations", Busan, Korea, May 21-25, 2018, XP051441093, 5 pages.

* cited by examiner

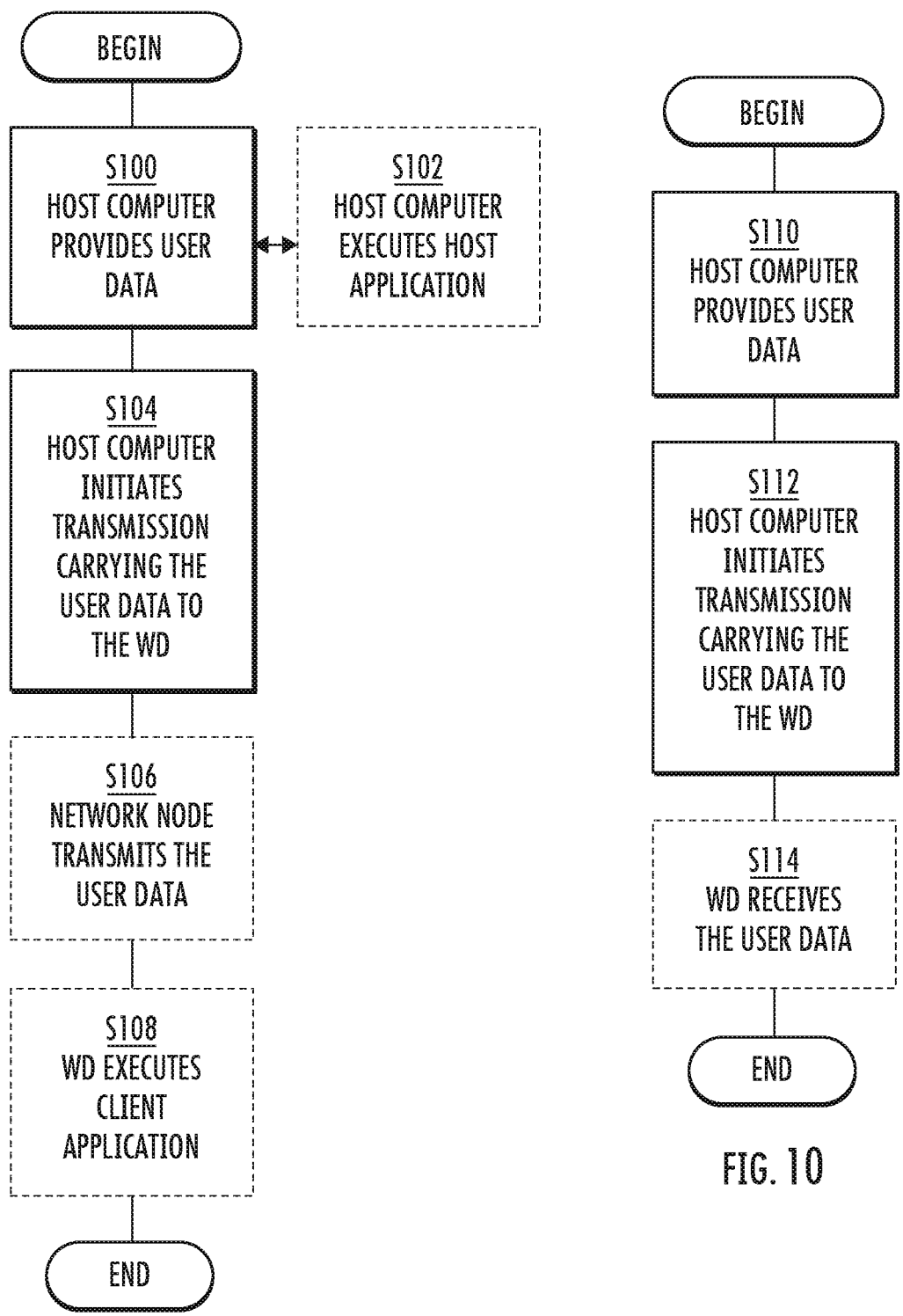

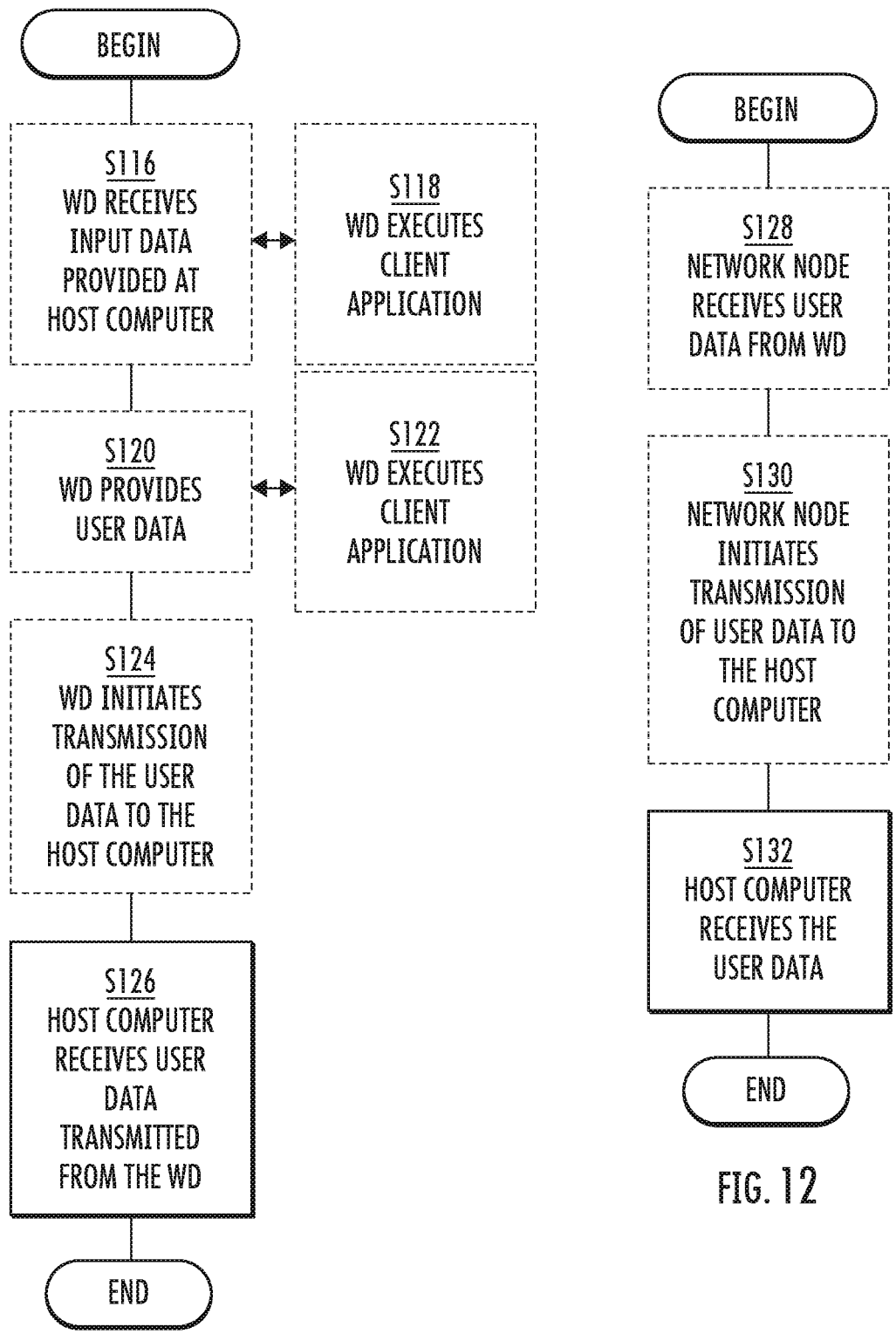

COMPRESSED TABLE-BASED CONFIGURATION OF REMAINING MINIMUM SYSTEM INFORMATION CORESET IN A NEW RADIO PHYSICAL BROADCAST CHANNEL

CROSS-REFERENCE TO RELATED APPLICATIONS

This application is a 35 U.S.C § 371 national stage application for International Application No. PCT/SE2018/051179, entitled "COMPRESSED TABLE-BASED CONFIGURATION OF REMAINING MINIMUM SYSTEM INFORMATION CORESET IN A NEW RADIO PHYSICAL BROADCAST CHANNEL", filed on Nov. 15, 2018, which claims priority to U.S. Provisional Patent Application No. 62/587,808, filed on Nov. 17, 2017, the disclosures and contents of which are hereby incorporated by reference in their entireties.

TECHNICAL FIELD

The present disclosure relates to wireless communications, and in particular, to reducing a number of bits of a physical broadcast channel (PBCH) used to broadcast a configuration of a remaining minimum system information data set.

BACKGROUND

In order to connect to a network, a wireless device needs to acquire network synchronization and obtain essential system information (SI) including SI in a management information base (MIB) and remaining minimum system information (RMSI). Synchronization signals are used for adjusting the frequency of the wireless device relative to the network, and for finding the proper timing of the received signal from the network. In New Radio (NR), the synchronization and access procedure may involve several signals:

Primary synchronization signal (PSS)—The PSS allows for network detection in the presence of a high initial frequency error, up to tens of ppm.

Secondary synchronization signal (SSS)—The SSS allows for more accurate frequency adjustments and channel estimation while at the same time providing fundamental network information, e.g., cell ID.

Physical Broadcast channel (PBCH)—The PBCH provides a subset of the minimum system information for random access and configurations for fetching remaining minimum system information in RMSI. It will also provide timing information within a cell, e.g., to separate timing between beams transmitted from a cell. The amount of information to fit into the PBCH is of course highly limited to keep the size down. Furthermore, demodulation reference signals (DMRS) are interleaved with PBCH resources to receive the PBCH properly.

A synchronization signal and PBCH block (SS/PBCH block, or SSB in shorter format) comprises the above signals (PSS, SSS and PBCH demodulation reference signal (DMRS)), and PBCH. The SSB may have 15 kHz, 30 kHz, 120 kHz or 240 kHz subcarrier spacing (SCS).

Remaining Minimum System Information (RMSI) is carried in a physical downlink shared channel (PDSCH) scheduled by a physical downlink control channel (PDCCH) in New Radio (NR), and contains remaining minimum system information, e.g., the bit map of the actually-transmitted SS/PBCH blocks. RMSI can have 15 kHz, 30 kHz, 60 kHz or 120 kHz SCS.

In NR, the physical broadcast channel transmission scheme is under discussion, and as the proposed format shown in FIG. 1.

In the illustration, a total of 4 orthogonal frequency division multiplex (OFDM) symbols are used for NR-PBCH, NR-PSS and NR-SSS transmission. NR-PSS is defined to be 127 subcarriers wide whereas the whole synchronization signal (SS) block is supposed to be 240 subcarriers wide (the number of physical resource blocks (PRB) for SSB is assumed to be 20 based on the Third Generation Partnership Project (3GPP) Radio Access Network (RAN)1 #90bis meeting agreement).

A number of SS/PBCH blocks, that are typically close in time, constitute an SS burst set. An SS burst set is transmitted periodically, as shown in FIGS. 2 and 3, and the wireless device (WD) can, by using the SS blocks in the SS burst set, determine the downlink timing and frequency offset, and acquire some fundamental system information (e.g., RMSI configuration) from the PBCH.

After correctly decoding one SS/PBCH block, the WD will try to decode the corresponding RMSI to get remaining system information based on the configurations for RMSI in PBCH payload which has quite a limited number of bits.

At a 3GPP RAN1 #90bis meeting, the following RMSI related topics were discussed:

Agreement 1:
(working assumption) The NR-PBCH has a payload size of 56 bits (including cyclic redundancy check (CRC));
A 10-bit special frame number (SFN) is carried by NR-PBCH;
(working assumption) A 4-bit physical resource block (PRB) grid offset is carried by NR-PBCH;

Agreement 2:
The WD minimum bandwidth in the context of confinement of RMSI and the control resource set (CORESET) containing the PDCCH scheduling RMSI is defined as the largest bandwidth that all WDs must support regardless of WD capability, which is at least no less than the SS/PBCH bandwidth;
The bandwidth for RMSI and CORESET containing PDCCH scheduling RMSI supports at least the same bandwidth as SS/PBCH (e.g., [24 PRBs]);
Note: The WD minimum bandwidth will be finally determined by RAN4.

Agreement 3:
The initial active downlink bandwidth part (DL BWP) is defined as frequency location and bandwidth of RMSI CORESET and numerology of RMSI;
a) PDSCH delivering RMSI are confined within the initial active DL BWP.

Agreement 4:
(Working assumption) PBCH contents, except the SSB index, should be the same for all SS/PBCH blocks within an SSB burst set for the same center frequency;
The maximum number of bits for configuration of RMSI CORESET(s) and RMSI timing in PBCH is X bits excluding the subcarrier spacing;
X is to be decided (TBD), and can be chosen to be up to [8] bits;
Note: RMSI CORESET(s) means the CORESET(s) configured by PBCH.

The configuration of RMSI CORESET(s) should consider at least the following properties:
bandwidth (PRBs);
frequency position (frequency offset relative to SS/PBCH block);
A set of consecutive OFDM symbol indices in a slot corresponding to a single CORESET;
For further study (FFS): signaling details including what is captured in specifications and what is signaled in the master information block (MIB);

The RMSI timing configuration should consider at least the following properties:
RMSI PDCCH monitoring window periodicity y;
RMSI PDCCH monitoring window duration x;
FFS: RMSI PDCCH monitoring window offset;
FFS: The number of RMSI PDCCH monitoring occasions per SSB within the RMSI PDCCH monitoring window periodicity;
FFS: signaling details including what is captured in specifications and what is signaled in the MIB.

In summary, it has been discussed that the RMSI Configuration (including both RMSI CORESET and RMSI PDCCH monitoring window definition) should be defined in the PBCH payload, where there are only about 8 bits for this definition.

SUMMARY

The RMSI configuration requires many parameters to be considered and the number of bits leftover for this configuration is just 8 bits based on current working assumptions. So, both PBCH payload overhead and granularity of the information should be considered when designing an RMSI configuration.

Some embodiments advantageously provide methods, systems, and apparatuses for reducing a number of bits of a physical broadcast channel (PBCH) used to broadcast a configuration of a remaining minimum system information (RMSI) data set as compared with other arrangements.

In some embodiments, a configuration table is created based on at least a subset of the below assumptions to reduce the number of entries and consequently, to reduce a number of bits of the PBCH used to encode the RMSI configuration:
The RMSI CORESET bandwidth is fixed (e.g., to 20 PRBs, preferred) or limited to a maximum of two sizes (e.g., 20 PRBs and 48 PRBs) depending on the frequency band range;
The RMSI CORESET should be always started within a restricted time duration of, e.g., 20 ms starting from the $1^{st}$ subframe of the SS burst set in which the corresponding SS/PBCH block is transmitted;
When the RMSI CORESET and SS/PBCH block are time multiplexed, they will have the same frequency position (e.g., RMSI is in the center band of SS/PBCH block except that some subcarrier level offset due to RMSI has to be physical resource block (PRB)-aligned);
If a mini-slot is configured for a RMSI time-multiplexed with SS/PBCH block, RMSI CORESET and the scheduled PDSCH carrying RMSI can only be sent on the same 4 OFDM symbol positions (considering RMSI SCS) as mapped for the SS/PBCH block in each slot; when 60 kHz SCS is used for RMSI, the mapping method is the same as the SS/PBCH block with e.g., 120 kHz SCS;
When RMSI CORESET and SS/PBCH block are frequency multiplexed:
The RMSI CORESET and the scheduled PDSCH carrying RMSI are in a time duration of 2, 4 or 7 OS with RMSI numerology starting from the beginning of the associated SS/PBCH block;
The RMSI CORESET and SS/PBCH block will have different frequency positions in which case the monitoring window offset is 0; and
The frequency position of the RMSI CORESET is limited to be positioned to a small set of fixed positions (e.g. above, below) in relation to the frequency position of the associated SS/PBCH block;
The RMSI CORESET is defined in a table containing a "NULL" value, indicating that no RMSI is transmitted in association with this SS/PBCH block (and hence no RMSI CORESET is defined); and
If there are further retransmissions in the following 20 ms periods, the position of the RMSI CORESET is the same as the one in the $1^{st}$ 20 ms period.

With the method described herein, 8 bits can carry all of the RMSI configuration candidates and some entries can be reserved for future use. The WD can find the RMSI using blind detection within 1 or 2 ms, which is not so long a time duration as the gNB does not require any response after WD receives the RMSI. When a mini-slot is configured, after the 1st RMSI is correctly decoded, the SS burst set periodicity and the actually transmitted SS/PBCH blocks are known, and the WD can skip the positions occupied by SS/PBCH blocks actually transmitted when trying to find following RMSIs.

In some embodiments include a method implemented in a wireless device 22, the method including receiving a physical broadcast channel, PBCH, decoding the PBCH, and determining a remaining minimum system information (RMSI) configuration based on bits of the PBCH.

According to this aspect, in some embodiments, a determined number of bits of the PBCH is eight. In some embodiments, the WD assumes that an RMSI control resource set, CORESET, monitoring window corresponding to a synchronization signal/physical broadcast channel, SS/PBCH, block in a radio frame satisfies a condition that modulo (system frame number, 2) equals zero or one. In some embodiments, the WD is configured to expect an RMSI Control Resource Set, CORSET, to begin within 20 ms starting from a first subframe of a synchronization signal burst set in which a corresponding synchronization signal/physical broadcast channel, SS/PBCH, block is transmitted. In some embodiments, when there are further retransmissions in subsequent 20 ms periods, the WD is configured to expect that a RMSI CORESET is in a same position as in a first transmission. In some embodiments, the WD is configured to expect an RMSI Control Resource Set, CORESET, time duration to be 1, 2 or 3 symbols long. In some embodiments, the WD finds the RMSI configuration using blind detection within 2 milli-seconds. In some embodiments, when a mini-slot is configured, after a first RMSI configuration is correctly decoded, the WD omits to search positions occupied by synchronization signal/physical broadcast channel, SS/PBCH, blocks actually transmitted when searching for subsequent RMSI configurations.

According to another aspect, a wireless device, WD, is configured to communicate with a network node. The WD 22 includes a radio interface configured to receive a physical broadcast channel, PBCH. The WD also includes processing circuitry configured to: decode the PBCH and determine a remaining minimum system information, RMSI, based on bits of the PBCH.

According to this aspect, in some embodiments, a determined number of bits of the PBCH is eight. In some embodiments, the WD assumes that an RMSI control resource set, CORESET, monitoring window corresponding to a synchronization signal/physical broadcast channel, SS/PBCH, block in a radio frame satisfies a condition that modulo (system frame number, 2) equals zero or one. In some embodiments, the WD is configured to expect an RMSI Control Resource Set, CORSET, to begin within 20 ms starting from a first subframe of a synchronization signal burst set in which a corresponding synchronization signal/physical broadcast channel, SS/PBCH, block is transmitted. In some embodiments, when there are further retransmissions in subsequent 20 ms periods, the WD is configured to expect that a RMSI CORESET is in a same position as in a first transmission. In some embodiments, the WD is configured to expect an RMSI Control Resource Set, CORESET, time duration to be 1, 2 or 3 symbols long. In some embodiments, the WD finds the RMSI configuration using blind detection within 2 milli-seconds. In some embodiments, when a mini-slot is configured, after a first RMSI configuration is correctly decoded, the WD omits to search positions occupied by synchronization signal/physical broadcast channel, SS/PBCH, blocks actually transmitted when searching for subsequent RMSI configurations.

According to yet another aspect, a method performed by a network node 16 configured to broadcast a configuration of a remaining minimum system information, RMSI, data set on a physical broadcast channel, PBCH, is provided. The method includes determining an RMSI configuration based on a set of assumptions used to determine bits to represent the RMSI configuration. The method further includes broadcasting the RMSI configuration using the determined bits via the PBCH.

According to this aspect, in some embodiments, the set of assumptions includes an assumption that an RMSI control resource set, CORSET, bandwidth is one of fixed and limited to two sizes. In some embodiments, the set of assumptions includes an assumption that an RMSI control resource set, CORESET, is always started within a restricted time duration starting from a first subframe of a synchronization signal, SS, burst set in which a corresponding synchronization signal/physical broadcast channel, SS/PBCH, block is transmitted. In some embodiments, the set of assumptions includes an assumption that when an RMSI control resource set, CORESET, and synchronization signal/physical broadcast channel, SS/PBCH, are time multiplexed, they share a same frequency. In some embodiments, the set of assumptions include an assumption concerning mapping of orthogonal frequency division multiplexing, OFDM, symbol positions for a synchronization signal/physical broadcast channel, SS/PBCH, block, a mapping method being the same when subcarrier spacing is one of 60 kHz and 120 kHz. In some embodiments, when an RMSI control resource set, CORESET, and synchronization signal/physical broadcast channel, SS/PBCH, block are frequency multiplexed, the set of assumptions include that the RMSI CORESET and a scheduled physical downlink shared channel (PDSCH) carrying RMSI are in a time duration of 2, 4 or 7 OFDM symbols using RMSI numerology starting from a beginning of an associated SS/PBCH block, the RMSI CORESET and SS/PBCH block have different frequency positions and a monitoring window offset is 0, and a frequency position of the RMSI CORESET is limited to be positioned to a set of fixed positions in relation to the frequency position of the associated SS/PBCH block. In some embodiments, the set of assumptions includes an assumption that an RMSI control resource set, CORSET, is defined in an RMSI configuration table containing a NULL value indicating that no RMSI is transmitted in association with a particular synchronization signal/physical broadcast channel, SS/PBCH, block. In some embodiments, the set of assumptions includes an assumption that further transmission of the RMSI configuration follow in 20 ms periods following a first transmission of the RMSI configuration. In some embodiments, the RMSI configuration is stored in two four bit sets. In some embodiments, a time duration of an RMSI control resource set, CORESET, is within one of one, two and three symbols.

According to another aspect, a network node 16 configured to broadcast a configuration of a remaining minimum system information, RMSI, data set on a physical broadcast channel, PBCH, is provided. The network node includes processing circuitry configured to determine an RMSI configuration based on a set of assumptions used to determine a number of bits to represent the RMSI configuration, and a radio interface configured to broadcast the RMSI configuration using the determined number of bits via the PBCH.

According to this aspect, in some embodiments, the set of assumptions includes an assumption that an RMSI control resource set, CORSET, bandwidth is one of fixed and limited to two sizes. In some embodiments, the set of assumptions includes an assumption that an RMSI control resource set, CORESET, is always started within a restricted time duration starting from a first subframe of a synchronization signal, SS, burst set in which a corresponding synchronization signal/physical broadcast channel, SS/PBCH, block is transmitted. In some embodiments, the set of assumptions includes an assumption that when an RMSI control resource set, CORESET, and synchronization signal/physical broadcast channel, SS/PBCH, are time multiplexed, they share a same frequency. In some embodiments, the set of assumptions include an assumption concerning mapping of orthogonal frequency division multiplexing, OFDM, symbol positions for a synchronization signal/physical broadcast channel, SS/PBCH, block, a mapping method being the same when subcarrier spacing is one of 60 kHz and 120 kHz. In some embodiments, when an RMSI control resource set, CORESET, and synchronization signal/physical broadcast channel, SS/PBCH, block are frequency multiplexed. The set of assumptions include that: the RMSI CORESET and a scheduled physical downlink shared channel, PDSCH, carrying RMSI are in a time duration of 2, 4 or 7 OFDM symbols using RMSI numerology starting from a beginning of an associated SS/PBCH block; the RMSI CORESET and SS/PBCH block have different frequency positions and a monitoring window offset is 0; and a frequency position of the RMSI CORESET is limited to be positioned to a set of fixed positions in relation to the frequency position of the associated SS/PBCH block. In some embodiments, the set of assumptions includes an assumption that an RMSI control resource set, CORSET, is defined in an RMSI configuration table containing a NULL value indicating that no RMSI is transmitted in association with a particular synchronization signal/physical broadcast channel, SS/PBCH, block. In some embodiments, the set of assumptions includes an assumption that further transmissions of the RMSI configuration follow in 20 ms periods following a first transmission of the RMSI configuration. In some embodiments, the RMSI configuration is stored in two four bit sets. In some embodiments, a time duration of an RMSI control resource set, CORESET, is within one of one, two and three symbols.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flowchart illustrating exemplary methods implemented in a communication system including a host computer, a network node and a wireless device for executing a client application at a wireless device according to some embodiments of the present disclosure;

FIG. 10 is a flowchart illustrating exemplary methods implemented in a communication system including a host computer, a network node and a wireless device for receiving user data at a wireless device according to some embodiments of the present disclosure;

FIG. 11 is a flowchart illustrating exemplary methods implemented in a communication system including a host computer, a network node and a wireless device for receiving user data from the wireless device at a host computer according to some embodiments of the present disclosure;

FIG. 12 is a flowchart illustrating exemplary methods implemented in a communication system including a host computer, a network node and a wireless device for receiving user data at a host computer according to some embodiments of the present disclosure;

DETAILED DESCRIPTION

Figure 1:
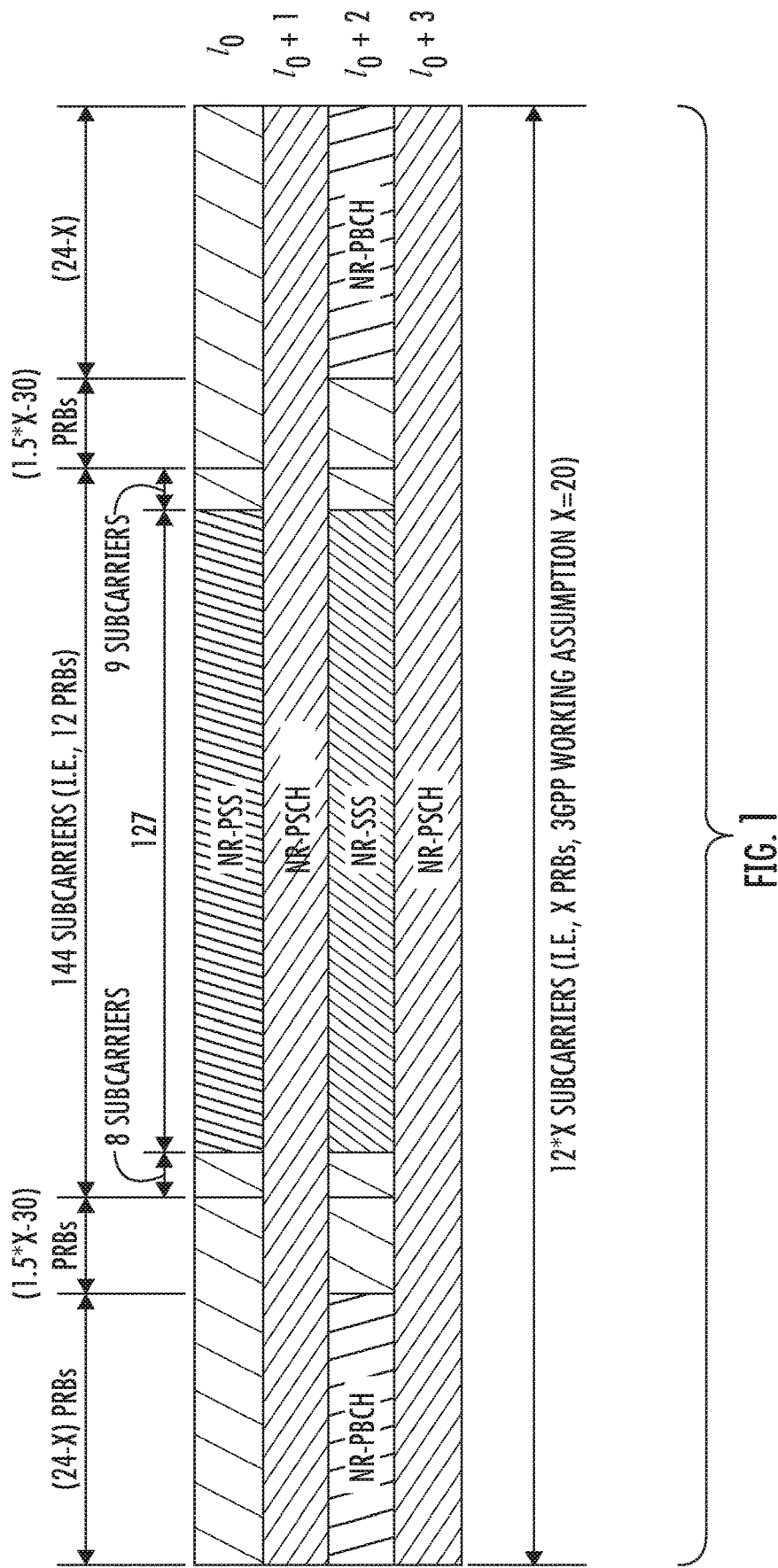
FIG. 1 is a format for a PBCH scheme.
Figure 2:
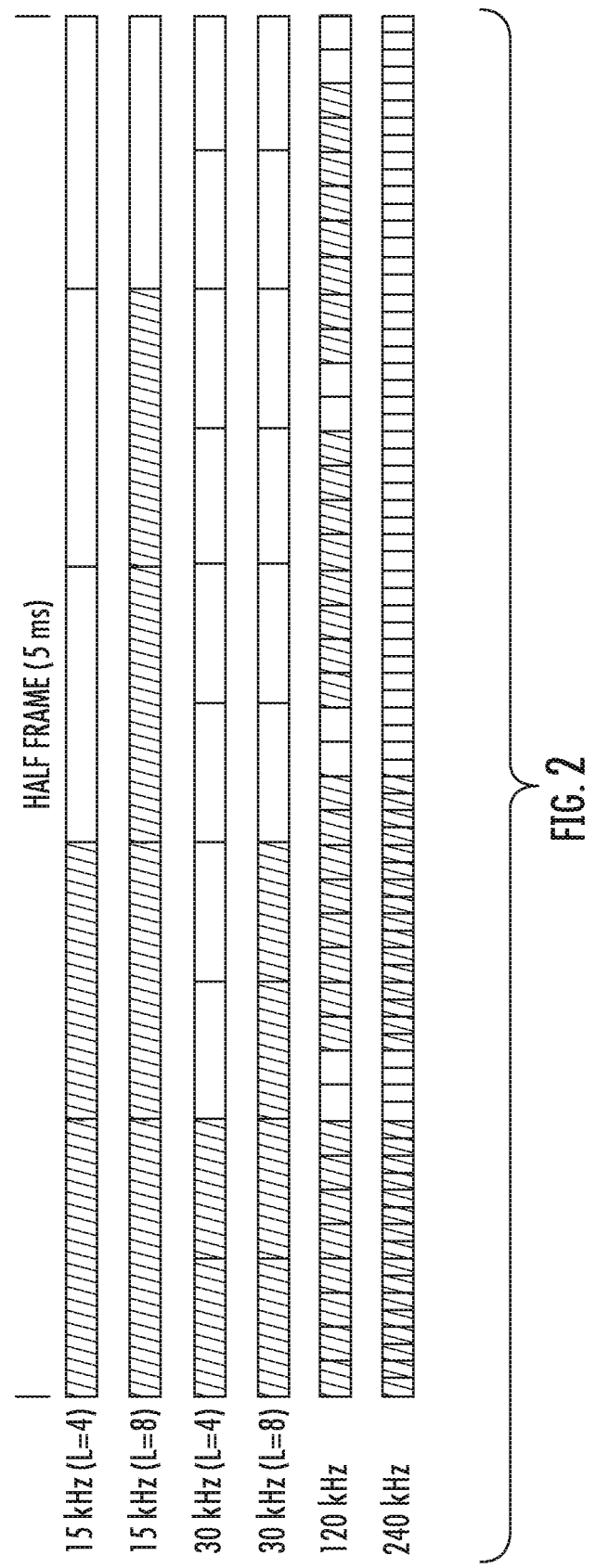
FIG. 2 is a first SS burst set to be transmitted periodically.
Figure 3:
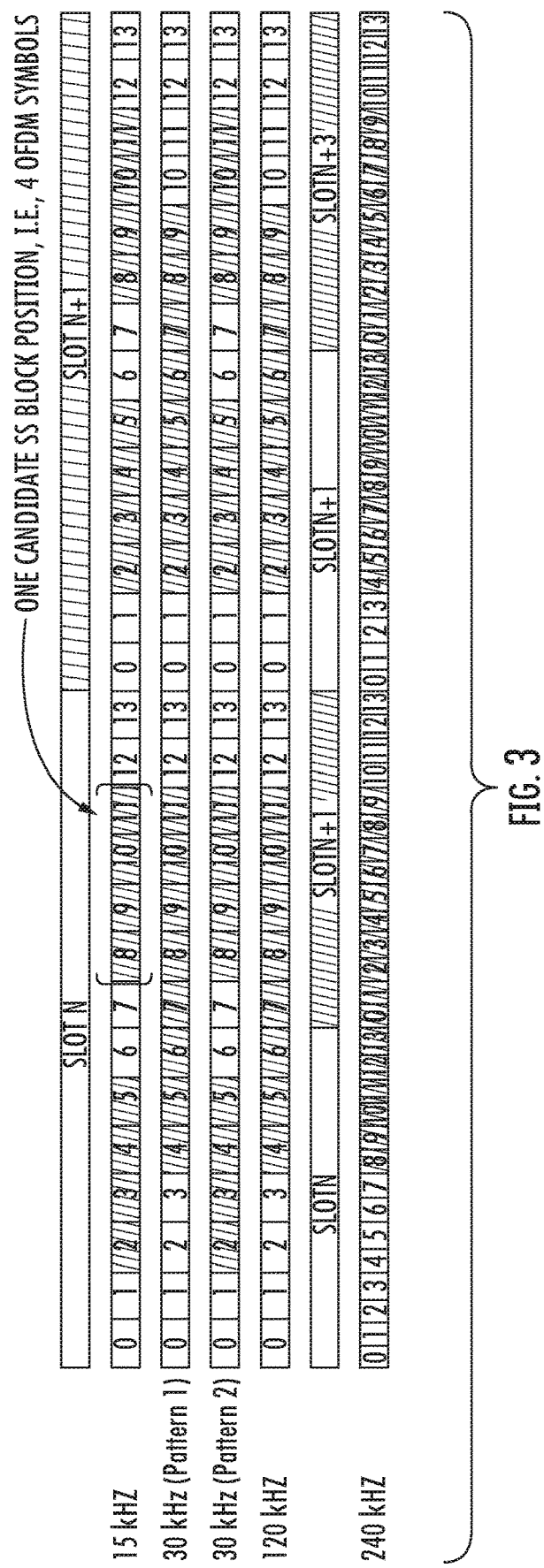
FIG. 3 is a second SS burst to be transmitted periodically.

Before describing in detail exemplary embodiments, it is noted that the embodiments reside primarily in combinations of apparatus components and processing steps related to reducing a number of bits of a physical broadcast channel (PBCH) used to broadcast a configuration of a remaining minimum system information data set as compared with known arrangements. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments propose using a table based on some assumptions described above in the Summary section to define the RMSI configuration in a PBCH payload considering both the overhead of the PBCH payload, the SS/PBCH block mapping and the complexity of DCI detection for RMSI.

Figure 4:
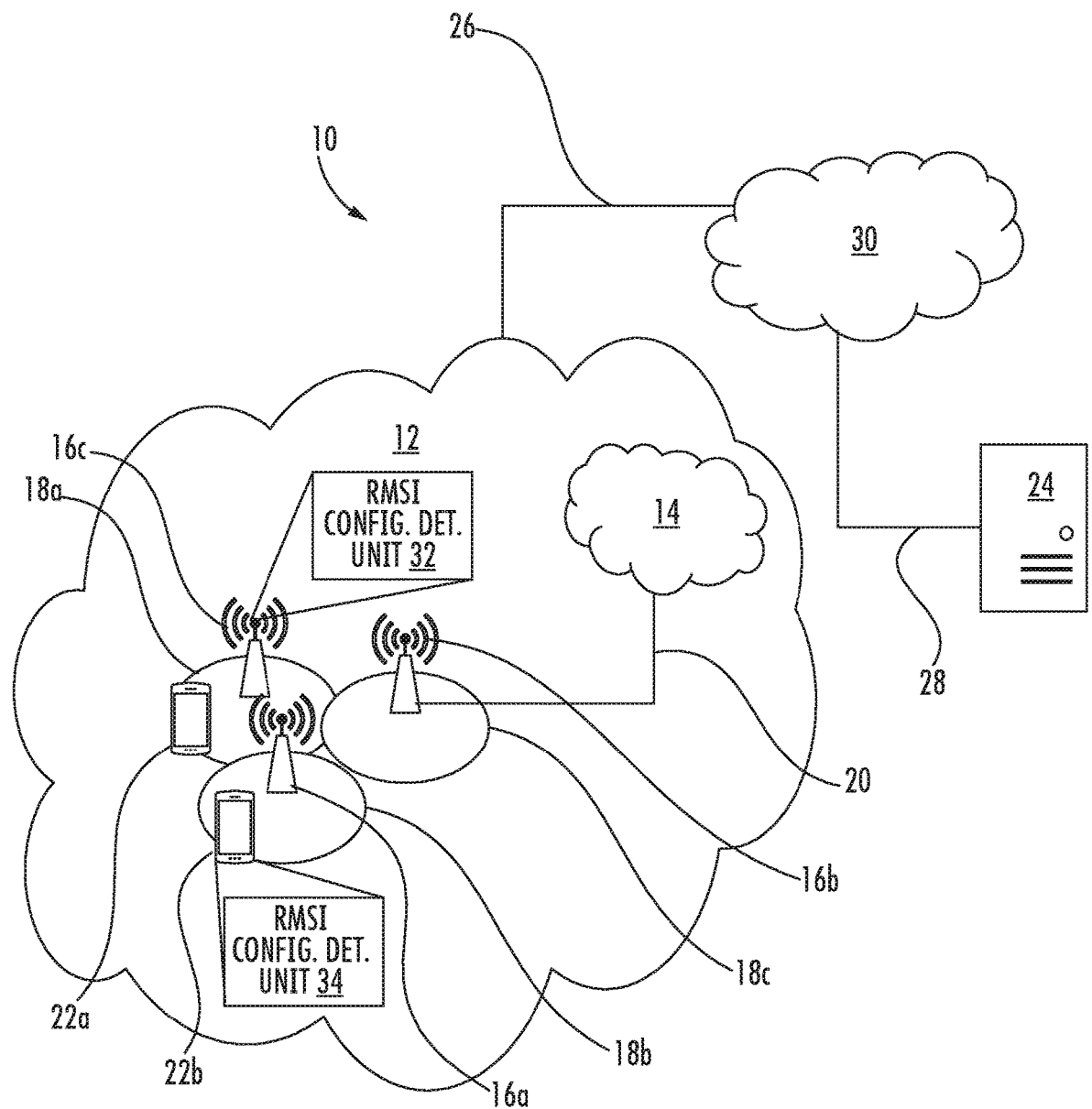
FIG. 4 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 4 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

The communication system 10 may itself be connected to or include a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more subnetworks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an RMSI configuration determination unit 32 which is configured to determine a remaining minimum system information, RMSI, configuration based on a table of assumptions used to determine a number of bits to represent the RMSI configuration. A wireless device 22 is configured to include an RMSI configuration determination unit 34 which is configured to decode the PBCH to determine the RMSI configuration using a number of bits of the PBCH, the number of bits being determined based on a table of assumptions stored at the network node.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. In one embodiment, the host computer 24 may be configured for providing control and functionality to a service provider and may be operated by the service provider or on behalf of the service provider.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an RMSI configuration determination unit 32 configured to determine a remaining minimum system information, RMSI, configuration based on a table of assumptions used to determine a number of bits to represent the RMSI configuration. Also, the radio interface 62 may be configured to broadcast the RMSI configuration using the determined number of bits via a physical broadcast channel, PBCH.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an RMSI configuration determination unit 34 configured to decode the PBCH to determine the RMSI configuration using a number of bits of the PBCH, the number of bits being determined based on a table of assumptions stored at the network node. Also, the radio interface 82 may be configured to receive the RMSI configuration on a physical broadcast channel, PBCH.

Figure 5:
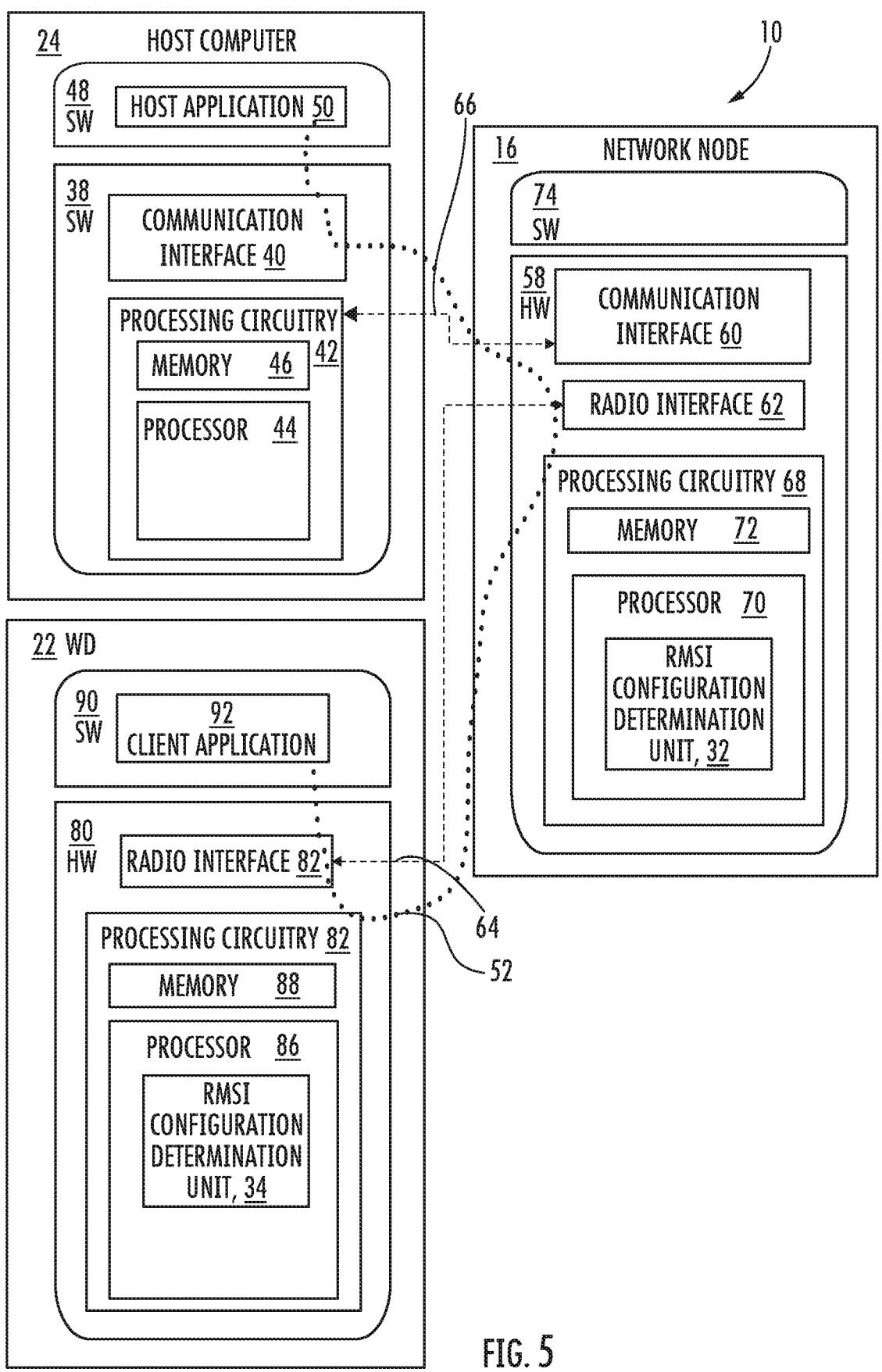
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Note that although FIGS. 4 and 5 show various units such as the RMSI configuration determination units 32 and 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
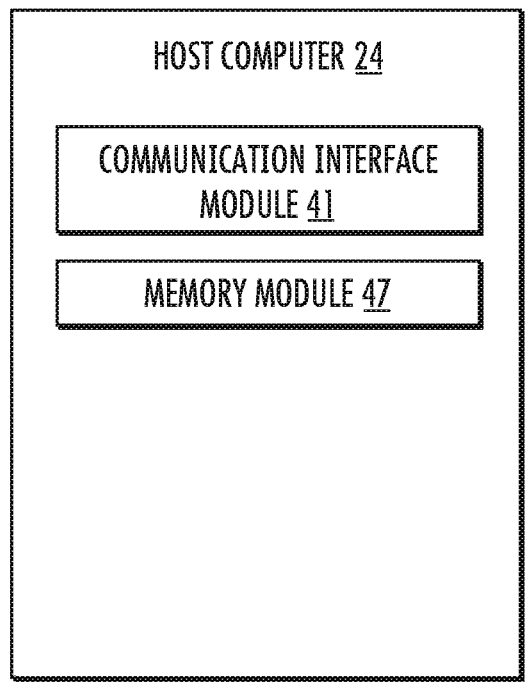
FIG. 6 is a block diagram of an alternative embodiment of a host computer according to some embodiments of the present disclosure.

FIG. 6 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein.

Figure 7:
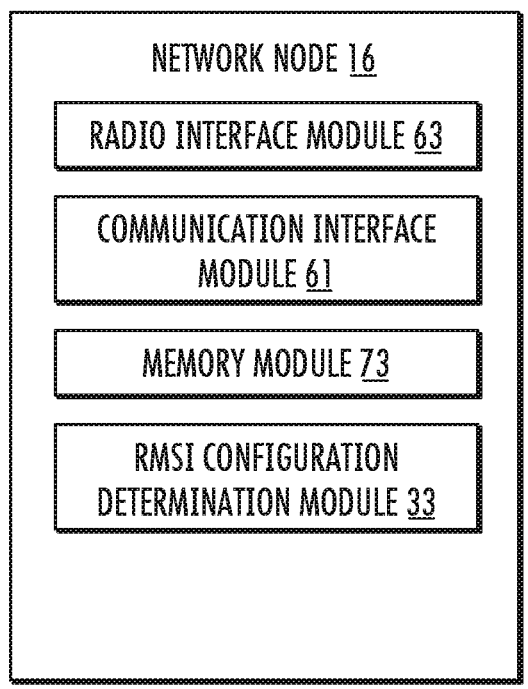
FIG. 7 is a block diagram of an alternative embodiment of a network node according to some embodiments of the present disclosure.

FIG. 7 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The RMSI configuration determination module 33 is configured to determine a remaining minimum system information, RMSI, configuration based on a table of assumptions used to determine a number of bits to represent the RMSI configuration. The radio interface module 63 is configured to broadcast the RMSI configuration using the determined number of bits via a physical broadcast channel, PBCH.

Figure 8:
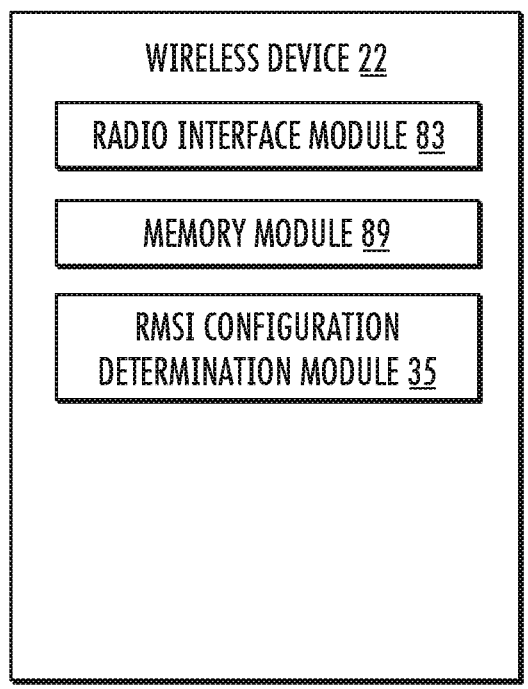
FIG. 8 is a block diagram of an alternative embodiment of a wireless device according to some embodiments of the present disclosure.

FIG. 8 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The RMSI configuration determination module 35 is configured to decode the PBCH to determine the RMSI configuration using a number of bits of the PBCH, the number of bits being determined based on a table of assumptions stored at the network node. The radio interface module 83 is configured to receive the RMSI configuration on a physical broadcast channel, PBCH.

FIG. 9 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIGS. 4 and 5. In a first step of the method, the host computer 24 provides user data (block S100). The user data may be data and information described herein as implementing the described functionality. In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 22 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 10 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 11 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD 22 provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 12 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 13:
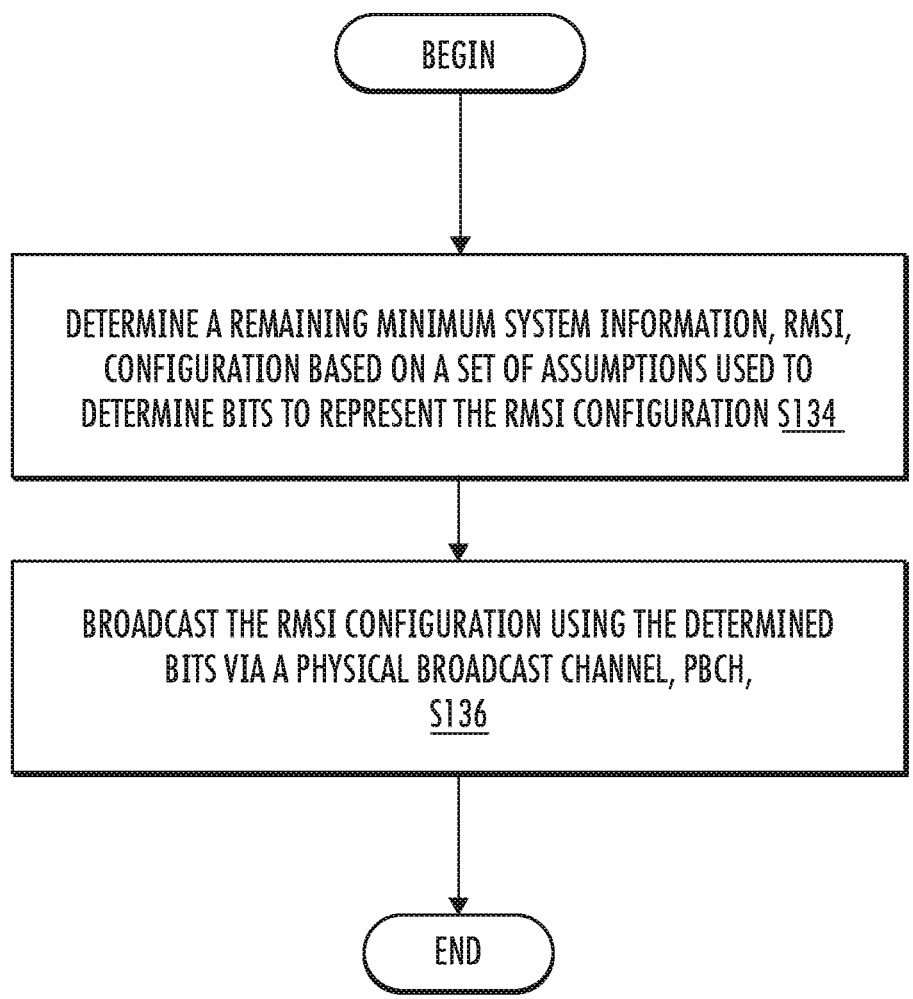
FIG. 13 is a flowchart illustrating exemplary methods implemented in a network node for broadcasting a channel containing an RMSI configuration according to some embodiments of the present disclosure.

FIG. 13 is a flowchart of an exemplary process in a network node 16 for broadcasting a channel containing an RMSI configuration according to some embodiments of the present disclosure. The process includes determining, via the RMSI configuration determination unit 32, a remaining minimum system information, RMSI, configuration based on a set of assumptions used to determine bits to represent the RMSI configuration (block S134). The process also includes broadcasting, via the radio interface 62, the RMSI configuration using the determined bits via a physical broadcast channel, PBCH (block S136).

Figure 14:
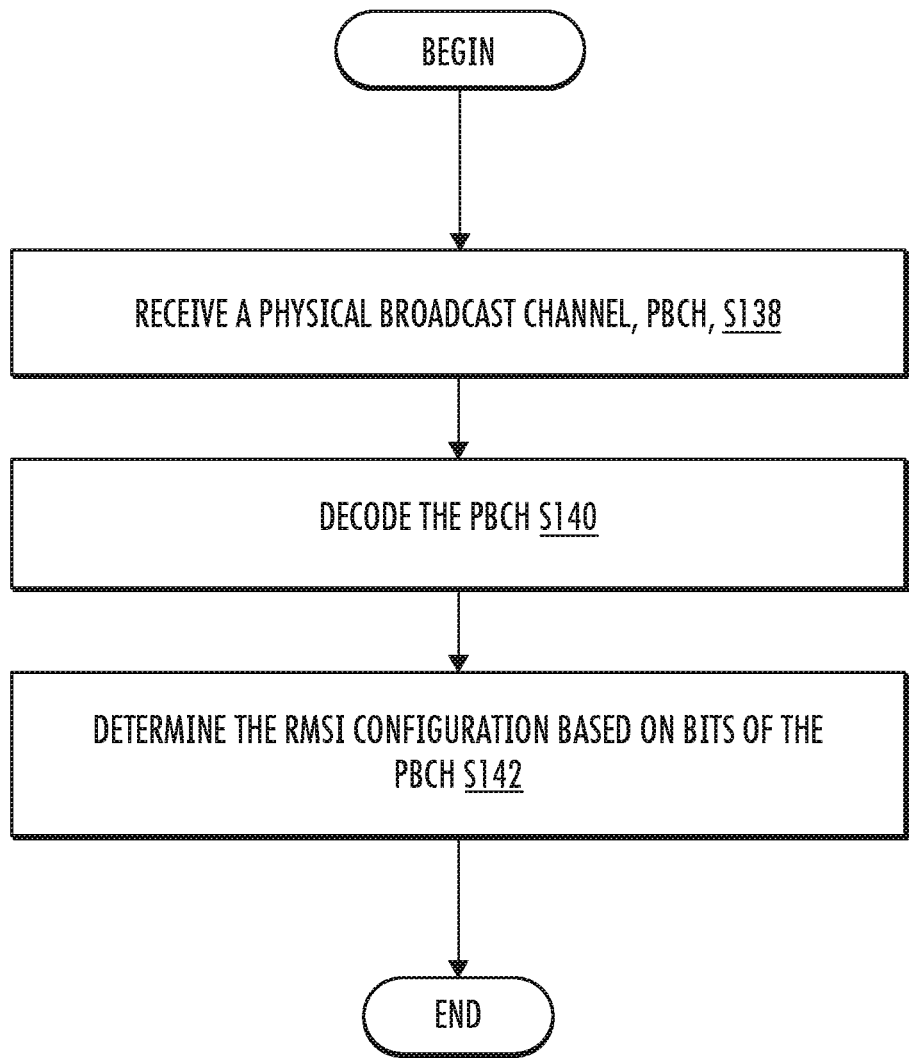
FIG. 14 is a flowchart of an exemplary process in a wireless device for receiving an RMSI configuration according to some embodiments of the present disclosure.

FIG. 14 is a flowchart of an exemplary process in a wireless device 22 for according to some embodiments of the present disclosure. The process includes receiving, via the radio interface 83, a physical broadcast channel, PBCH (block S138). The process also includes decoding such as via the processing circuitry 82, the PBCH (block S140). A RMSI configuration is determined, such as via the RMSI configuration determination unit 34, based on bits of the PBCH.

Having described the general process flow of arrangements of the disclosure and having provided examples of hardware and software arrangements for implementing the processes and functions of the disclosure, the sections below provide details and examples of arrangements for reducing a number of bits of a physical broadcast channel (PBCH) used to broadcast a configuration of a remaining minimum system information data set Several proposed features include:

Proposal 1 NR-PDSCH carrying the remaining minimum system information is periodically transmitted with different redundancy versions within the TTI of the RMSI (NR-SIB1).

Proposal 2 The periodicity of the NR-PDCCH/NR-PDSCH carrying RMSI is equal to the maximum of 20 ms and the SS Block periodicity.

Embodiments provide for RMSI configuration specification using a number of bits of the PBCH that are reduced as compared with known arrangements. Based on the assumptions above, the following is an example of a table that can be used for RMSI configuration, each value corresponding to one entry.

TABLE 1

| RMSI-Config | RMSI-CORESET-freq-pos-to-SSB (same/above/below) | RMSI-mini-slot-ind (0/1) | RMSI-CORESET-time-dur (1, 2, 3 OS) | RMSI-PDCCH-mon-win-dur (1, 2 ms) | RMSI-PDCCH-mon-win-offset (0, . . . , 19 ms) |
|---|---|---|---|---|---|
| 0 | Same | 0 | 1 | 1 | 0 |
| 1 | Same | 0 | 1 | 1 | 1 |
| 2 | Same | 0 | 1 | 1 | 2 |
| 3 | Same | 0 | 1 | 1 | 3 |
| 4 | Same | 0 | 1 | 1 | 4 |
| 5 | Same | 0 | 1 | 1 | 5 |
| 6 | Same | 0 | 1 | 1 | 6 |
| 7 | Same | 0 | 1 | 1 | 7 |
| 8 | Same | 0 | 1 | 1 | 8 |
| 9 | Same | 0 | 1 | 1 | 9 |
| 10 | Same | 0 | 1 | 1 | 10 |
| 11 | Same | 0 | 1 | 1 | 11 |
| 12 | Same | 0 | 1 | 1 | 12 |
| 13 | Same | 0 | 1 | 1 | 13 |
| 14 | Same | 0 | 1 | 1 | 14 |
| 15 | Same | 0 | 1 | 1 | 15 |
| 16 | Same | 0 | 1 | 1 | 16 |
| 17 | Same | 0 | 1 | 1 | 17 |
| 18 | Same | 0 | 1 | 1 | 18 |
| 19 | Same | 0 | 1 | 1 | 19 |
| 20 | Same | 0 | 1 | 2 | 0 |
| . . . | . . . | . . . | . . . | . . . | . . . |
| 239 | Same | 1 | 3 | 2 | 19 |
| 240 | Above | 1 | 1 | 1 | 0 |
| 241 | Above | 1 | 2 | 1 | 0 |
| 242 | Above | 1 | 3 | 1 | 0 |
| 243 | Below | 1 | 1 | 1 | 0 |
| 244 | Below | 1 | 2 | 1 | 0 |
| 245 | Below | 1 | 3 | 1 | 0 |
| 246 | Reserved | Reserved | Reserved | Reserved | Reserved |
| . . . | . . . | . . . | . . . | . . . | . . . |
| 254 | Reserved | Reserved | Reserved | Reserved | Reserved |
| 255 | | | NULL | | |

Proposal 3: The table is based on the following assumptions:
RMSI bandwidth is fixed to 20 PRBs.
RMSI CORESET should be always started within a restricted time duration of 20 ms starting from the 1st subframe of the SS burst set in which the corresponding SS/PBCH block is transmitted.
When RMSI CORESET and SS/PBCH block are time multiplexed, they will have same frequency position (in the same center band as SS/PBCH block except with some subcarrier spacings offset due to PRB level alignment). If a mini-slot is configured in this case, RMSI can only be sent on the same 4 OFDM symbol positions with RMSI numerology with the same mapping method for the SS/PBCH block in each slot. (If 60 kHz SCS is used for RMSI, the RMSI mapping is the same as the SS/PBCH block with 120 kHz SCS), And, RMSI is not transmitted on the OFDM symbols on which SS/PBCH is actually transmitted.
When RMSI CORESET and SS/PBCH block are frequency multiplexed, the RMSI CORESET and the scheduled PDSCH carrying RMSI are in a time duration of 2, 4 or 7 OS with RMSI numerology starting from the beginning of the associated SS/PBCH block. And in this case, the frequency position of the RMSI CORESET is limited to be positioned to a small set of fixed positions (above or below) in relation to the frequency position of the associated SS/PBCH block.
The RMSI CORESET is defined in a table containing a "NULL" value, indicating that no RMSI is transmitted in association with this SS/PBCH block (and hence no RMSI CORESET is defined).

Each column of the table is explained as follows:
RMSI-Config: this is carried in PBCH payload with 8 bits. Value range: 0-255. A value of 255 means there's no corresponding RMSI transmitted.
RMSI-CORESET-freq-pos-to-SSB: this indicates the frequency position of RMSI relative to the corresponding SS/PBCH block.
  "same" means RMSI and SSB are center aligned in PRB level except that there could be some subcarrier level offset due to RMSI being only PRB aligned;
  "above" means RMSI is above and adjacent to the corresponding SSB;
  "below" means RMSI is below and adjacent to the corresponding SSB.
RMSI-mini-slot-ind: this indicates whether a mini-slot or normal slot is used for RMSI.
0 means normal slot is used for RMSI;
1 means mini-slot is used for RMSI.
RMSI-CORESET-time-dur: this indicates the number of OFDM symbols for one RMSI CORESET. It can be 1, 2 or 3 OFDM symbols (OS).
RMSI-PDCCH-mon-win-dur: this indicates a window size in ms that the WD 22 should search for one PDCCH scheduling the PDSCH carrying RMSI in one 20 ms time frame;
1 means 1 ms window size;
2 means 2 ms window size.
RMSI-PDCCH-mon-win-offset: this indicates an offset in ms starting from the position of the 1st subframe of the half-frame containing the detected SS/PBCH block to the start of the RMSI PDCCH monitoring window. Value range: 0-19 ms.

The periodicity of the NR-PDSCH carrying the remaining minimum system information does not have to be the same as the TTI of the content of the channel (i.e. the NR-SIB1). It is beneficial that WDs in good channel conditions can decode the NR-PDSCH from only one repetition of the physical channel. However, in order to keep the overhead from the NR-PDSCH carrying the remaining minimum system information low, coverage limited WDs should be able to combine multiple repetitions before decoding the NR-PDSCH carrying the remaining minimum system information. This can be handled by transmitting different redundancy versions at each instance of the NR-PDSCH within the associated TTI.

At RAN1 #88bis it was agreed that the maximum synchronization signal (SS) Block periodicity is 160 ms. This SS Block periodicity does not support initial access and hence it is unclear if any RMSI need to be transmitted in a cell with 160 ms SS Block periodicity. However, for providing additional parameters (e.g. the global cell ID required for automatic neighbor relation (ANR) configuration algorithms) a RMSI transmission is required. The decision on the TTI for the remaining minimum system information (i.e. NR-SIB1) is left for RAN2 to decide. In the RAN2 paper it is proposed that the TTI of the NR-SIB1 should be 160 ms.

Figure 15:
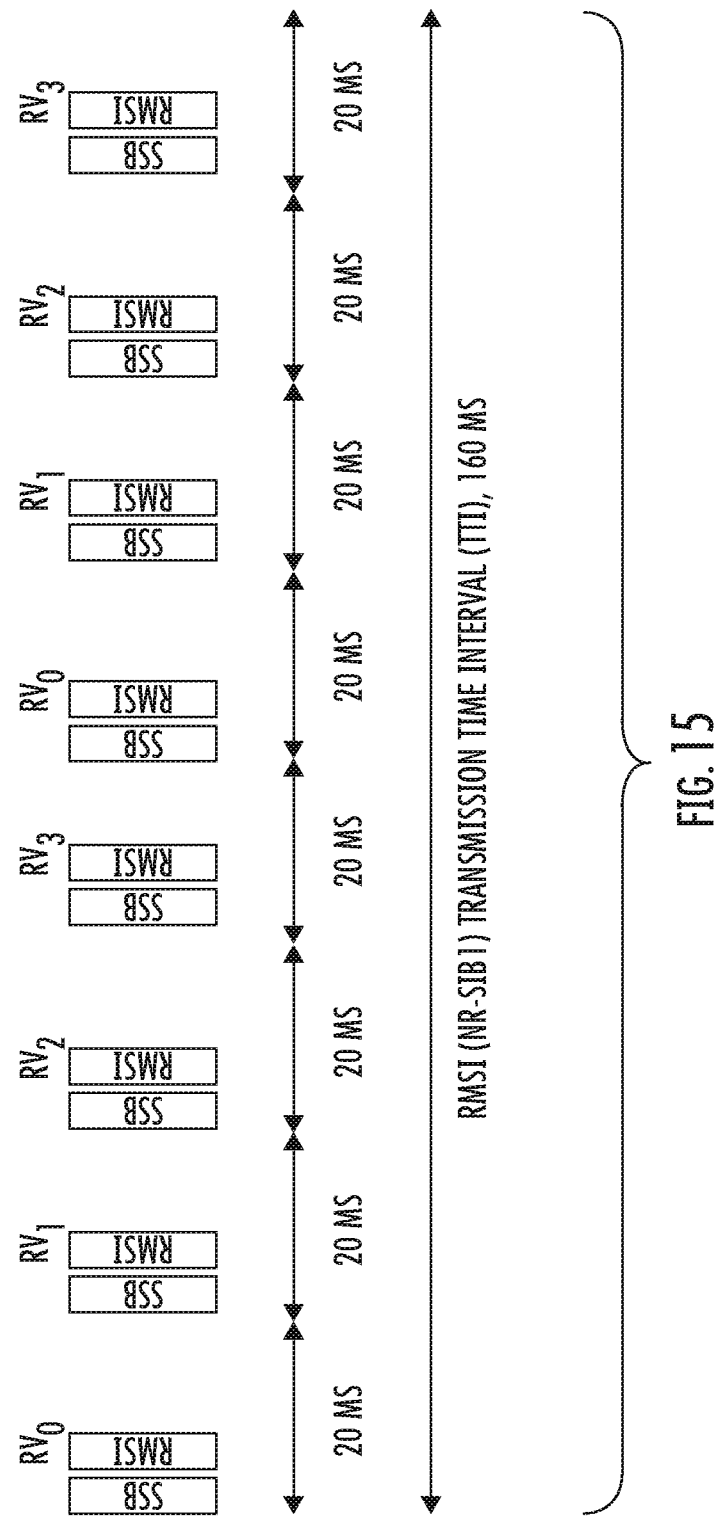
FIG. 15 shows an example of a TTI of an RMSI.

There may be a dependence between the SS Block periodicity and the TTI of the RMSI that needs to be considered also in RAN1. The periodicity of NR-PDSCH carrying RMSI should preferably be equal to, or lower than, the periodicity of the SS Block transmission (e.g., 5, 10, 20, 40, 80, 160 ms). An example is shown in FIG. 15. In this example, the WD receives at least one SS Block and at least one redundancy version of NR-PDSCH every 20 ms while the TTI of the remaining minimum system information is 160 ms.

For cells supporting initial access the SS Block periodicity can be 5, 10 or 20 ms and for NSA cells the SS Block can also be 40, 80, or 160 ms. Since SS Blocks are used for both idle mode (e.g. initial access) and active mode purposes (e.g. AMM measurements) it is not obvious that the RMSI which is primarily relevant for UEs in idle mode must be transmitted with the same periodicity as the SS Blocks. For example, using an SS Block periodicity of 5 ms could be beneficial in cells with high mobility WDs. But enforcing the condition that the RMSI must also transmitted with the same periodicity could result in unnecessary high overhead for the RMSI transmission.

It should be possible to beam-sweep the RMSI transmission at the same time as the SS Blocks are swept (e.g. frequency multiplexed with SS Blocks). When analog beamforming is used, the bandwidth not occupied by the SS Blocks will otherwise be wasted. When the analog beamformer in the transmitter is pointing in a certain direction it may not be possible to send data to a WD in any other beam.

In that case, and when there is sufficient system bandwidth to frequency multiplex the SS Block with the RMSI, it should be possible to transmit the RMSI in the same narrow beams as the SS Block. Both the SS Block and the RMSI should then be possible to transmit in one single beam sweep.

When there is not enough bandwidth for frequency multiplexing the SS Block and the RMSI in one sweep it should be possible to send the RMSI in a separate sweep, possibly using fewer beams and wider beams.

To frequency multiplex RMSI transmissions with SS Block transmissions it should be possible to transmit the NR-PDCCH/NR-PDSCH providing RMSI in the same symbols as those used by SS Blocks. This requires that the NR-PDCCH/NR-PDSCH providing RMSI can be transmitted in mini-slots. Mini-slots are also beneficial when RMSI transmissions are time-multiplexed with SS Block transmissions (e.g., in a separate sweep) since that can enable a faster RMSI delivery.

Several proposed features may include:

Proposal 4 RMSI transmissions can be both frequency-multiplexed as well as time-multiplexed with SS Block transmissions.

Proposal 5 RMSI transmissions can occur in mini-slots as well as in normal slots.

RAN1 has agreed supporting single or multiple SS Blocks within a wideband carrier in the frequency domain. If multiple SS blocks in the frequency domain is to be supported it will also have an impact on the RMSI transmission.

To avoid unnecessary overhead, it is important that introducing multiple frequency-multiplexed SS Block transmissions does not require that we also transmit RMSI on each of these frequencies.

Some proposed features may include:

Proposal 6 A wide-band carrier with multiple frequency-separated SS Blocks can be configured with only one RMSI transmission.

Before having read the RMSI, the WD has no knowledge of the actual band edges of the carrier and will not know the location of PRB 0. Hence, for the resource allocations for the RMSI the offset to the reference location of the lowest PRB of the SS/PBCH block can be fixed and given by the specification.

Some proposed features may include:

Proposal 7 For RMSI resource allocations, the offset to the reference location is fixed in the specification.

Once the WD has found a cell, it does not yet know which band it is in since the frequency bands supported by 3GPP are overlapping. Hence the WD needs to be informed of the frequency band and the bandwidth of the carrier.

Proposal 8 The frequency band is signaled in the RMSI

Proposal 9 The number of PRB in the DL carrier bandwidth is signaled in the RMSI Together with the signaling of the offset from the SS/PBCH block lower edge, the WD now has full knowledge of the DL carrier in the frequency domain For the uplink, if the spectrum is unpaired no additional signaling is needed. For paired spectrum, the WD also should know the UL carrier frequency, the UL bandwidth if that is different from the downlink carrier bandwidth.

For the UL carrier spacing, it is assumed that many deployments will use the default duplex spacing. In this case no additional signaling is needed as the WD can calculate the UL frequency from the band definition directly. Similar to LTE, an optional UL carrier frequency can be provided if default duplex spacing is not used. Not here, that for the UL there is no need to go via a reference location and an offset to find PRB as stated in the agreement above. Hence, some proposed features may include:

Proposal 10 For unpaired spectrum, no additional signaling of the UL carrier is needed.

Proposal 11 For paired spectrum, the following is signaled in RMSI a. An indication whether default duplex spacing is used b. If the indication above indicated that default duplex spacing is not used, the frequency location of PRB 0 in the is signaled directly c. UL bandwidth is signaled if different from downlink bandwidth Note that for the cases where the WD maximum UL bandwidth is equal or larger to the UL channel bandwidth, there is no need to signal the initial active UL bandwidth part. Hence, the signaling should be optional. Some proposed features include:

Proposal 12 The signaling of the initial active UL bandwidth part is optional in RMSI.

For the signaling of the uplink frequency as mentioned above and also for the measurement objects, there may be a need to define how the absolute frequency is signaled, similar to E-UTRA Absolute Radio Frequency Channel Number (EARFCN) in LTE.

Some further proposed features may include:

Proposal 13 The PBCH payload size is 56 bits including CRC bits, and detail definition of each parameter is stated in table 1.

Proposal 14 For PBCH 1st scrambling initialization, confirm that C_init=N^cell_ID Proposal 15 No additional bit is needed for the indication of PRB grid of RMSI Proposal 16 The subcarrier shift signaled in the SS/PBCH block is in the smallest of the subcarrier spacing of SS/PBCH block and RMSI Thus, some embodiments include a method implemented in a wireless device 22, the method including receiving (block S138) a physical broadcast channel, PBCH, decoding (block S140) the PBCH, and determining (block S142) a remaining minimum system information (RMSI) configuration based on bits of the PBCH.

According to this aspect, in some embodiments, a determined number of bits of the PBCH is eight. In some embodiments, the WD 22 assumes that an RMSI control resource set, CORESET, monitoring window corresponding to a synchronization signal/physical broadcast channel, SS/PBCH, block in a radio frame satisfies a condition that modulo (system frame number, 2) equals zero or one. In some embodiments, the WD 22 is configured to expect an RMSI Control Resource Set, CORSET, to begin within 20 ms starting from a first subframe of a synchronization signal burst set in which a corresponding synchronization signal/physical broadcast channel, SS/PBCH, block is transmitted. In some embodiments, when there are further retransmissions in subsequent 20 ms periods, the WD 22 is configured to expect that a RMSI CORESET is in a same position as in a first transmission. In some embodiments, the WD 22 is configured to expect an RMSI Control Resource Set, CORESET, time duration to be 1, 2 or 3 symbols long. In some embodiments, the WD 22 finds the RMSI configuration using blind detection within 2 milli-seconds. In some embodiments, when a mini-slot is configured, after a first RMSI configuration is correctly decoded, the WD 22 omits to search positions occupied by synchronization signal/physical broadcast channel, SS/PBCH, blocks actually transmitted when searching for subsequent RMSI configurations.

According to another aspect, a wireless device 22, WD, is configured to communicate with a network node 16. The WD 22 includes a radio interface 82 configured to receive a physical broadcast channel, PBCH. The WD 22 also includes processing circuitry 84 configured to: decode the PBCH and determine a remaining minimum system information, RMSI, based on bits of the PBCH.

According to this aspect, in some embodiments, a determined number of bits of the PBCH is eight. In some embodiments, the WD 22 assumes that an RMSI control resource set, CORESET, monitoring window corresponding to a synchronization signal/physical broadcast channel, SS/PBCH, block in a radio frame satisfies a condition that modulo (system frame number, 2) equals zero or one. In some embodiments, the WD 22 is configured to expect an RMSI Control Resource Set, CORSET, to begin within 20 ms starting from a first subframe of a synchronization signal burst set in which a corresponding synchronization signal/physical broadcast channel, SS/PBCH, block is transmitted. In some embodiments, when there are further retransmissions in subsequent 20 ms periods, the WD 22 is configured to expect that a RMSI CORESET is in a same position as in a first transmission. In some embodiments, the WD 22 is configured to expect an RMSI Control Resource Set, CORESET, time duration to be 1, 2 or 3 symbols long. In some embodiments, the WD 22 finds the RMSI configuration using blind detection within 2 milli-seconds. In some embodiments, when a mini-slot is configured, after a first RMSI configuration is correctly decoded, the WD 22 omits to search positions occupied by synchronization signal/physical broadcast channel, SS/PBCH, blocks actually transmitted when searching for subsequent RMSI configurations.

According to yet another aspect, a method performed by a network node 16 configured to broadcast a configuration of a remaining minimum system information, RMSI, data set on a physical broadcast channel, PBCH, is provided. The method includes determining (block S134) an RMSI configuration based on a set of assumptions used to determine bits to represent the RMSI configuration. The method further includes broadcasting (block S136) the RMSI configuration using the determined bits via the PBCH.

According to this aspect, in some embodiments, the set of assumptions includes an assumption that an RMSI control resource set, CORSET, bandwidth is one of fixed and limited to two sizes. In some embodiments, the set of assumptions includes an assumption that an RMSI control resource set, CORESET, is always started within a restricted time duration starting from a first subframe of a synchronization signal, SS, burst set in which a corresponding synchronization signal/physical broadcast channel, SS/PBCH, block is transmitted. In some embodiments, the set of assumptions includes an assumption that when an RMSI control resource set, CORESET, and synchronization signal/physical broadcast channel, SS/PBCH, are time multiplexed, they share a same frequency. In some embodiments, the set of assumptions include an assumption concerning mapping of orthogonal frequency division multiplexing, OFDM, symbol positions for a synchronization signal/physical broadcast channel, SS/PBCH, block, a mapping method being the same when subcarrier spacing is one of 60 kHz and 120 kHz. In some embodiments, when an RMSI control resource set, CORESET, and synchronization signal/physical broadcast channel, SS/PBCH, block are frequency multiplexed, the set of assumptions include that the RMSI CORESET and a scheduled physical downlink shared channel (PDSCH) carrying RMSI are in a time duration of 2, 4 or 7 OFDM symbols using RMSI numerology starting from a beginning of an associated SS/PBCH block, the RMSI CORESET and SS/PBCH block have different frequency positions and a monitoring window offset is 0, and a frequency position of the RMSI CORESET is limited to be positioned to a set of fixed positions in relation to the frequency position of the associated SS/PBCH block. In some embodiments, the set of assumptions includes an assumption that an RMSI control resource set, CORSET, is defined in an RMSI configuration table containing a NULL value indicating that no RMSI is transmitted in association with a particular synchronization signal/physical broadcast channel, SS/PBCH, block. In some embodiments, the set of assumptions includes an assumption that further transmission of the RMSI configuration follow in 20 ms periods following a first transmission of the RMSI configuration. In some embodiments, the RMSI configuration is stored in two four bit sets. In some embodiments, a time duration of an RMSI control resource set, CORESET, is within one of one, two and three symbols.

According to another aspect, a network node 16 configured to broadcast a configuration of a remaining minimum system information, RMSI, data set on a physical broadcast channel, PBCH, is provided. The network node includes processing circuitry 68 configured to determine an RMSI configuration based on a set of assumptions used to determine a number of bits to represent the RMSI configuration, and a radio interface 62 configured to broadcast the RMSI configuration using the determined number of bits via the PBCH.

According to this aspect, in some embodiments, the set of assumptions includes an assumption that an RMSI control resource set, CORSET, bandwidth is one of fixed and limited to two sizes. In some embodiments, the set of assumptions includes an assumption that an RMSI control resource set, CORESET, is always started within a restricted time duration starting from a first subframe of a synchronization signal, SS, burst set in which a corresponding synchronization signal/physical broadcast channel, SS/PBCH, block is transmitted. In some embodiments, the set of assumptions includes an assumption that when an RMSI control resource set, CORESET, and synchronization signal/physical broadcast channel, SS/PBCH, are time multiplexed, they share a same frequency. In some embodiments, the set of assumptions include an assumption concerning mapping of orthogonal frequency division multiplexing, OFDM, symbol positions for a synchronization signal/physical broadcast channel, SS/PBCH, block, a mapping method being the same when subcarrier spacing is one of 60 kHz and 120 kHz. In some embodiments, when an RMSI control resource set, CORESET, and synchronization signal/physical broadcast channel, SS/PBCH, block are frequency multiplexed. The set of assumptions include that: the RMSI CORESET and a scheduled physical downlink shared channel, PDSCH, carrying RMSI are in a time duration of 2, 4 or 7 OFDM symbols using RMSI numerology starting from a beginning of an associated SS/PBCH block; the RMSI CORESET and SS/PBCH block have different frequency positions and a monitoring window offset is 0; and a frequency position of the RMSI CORESET is limited to be positioned to a set of fixed positions in relation to the frequency position of the associated SS/PBCH block. In some embodiments, the set of assumptions includes an assumption that an RMSI control resource set, CORSET, is defined in an RMSI configuration table containing a NULL value indicating that no RMSI is transmitted in association with a particular synchronization signal/physical broadcast channel, SS/PBCH, block. In some embodiments, the set of assumptions includes an assumption that further transmissions of the RMSI configuration follow in 20 ms periods following a first transmission of the RMSI configuration. In some embodiments, the RMSI configuration is stored in two four bit sets. In some embodiments, a time duration of an RMSI control resource set, CORESET, is within one of one, two and three symbols.

Some example embodiments include:

Embodiment A1. A network node configured to communicate with a wireless device (WD), the network node comprising a radio interface and processing circuitry configured to:

determine a remaining minimum system information, RMSI, configuration based on a table of assumptions used to determine a number of bits to represent the RMSI configuration; and broadcast the RMSI configuration using the determined number of bits via a physical broadcast channel, PBCH.

Embodiment A2. The network node of Embodiment A1, wherein the table indicates a frequency position of the RMSI relative to a corresponding synchronization signal, SS/PBCH block.

Embodiment A3. The network node of Embodiment A1, wherein the table indicates a duration of a slot used to transmit the RMSI.

Embodiment A4. The network node of Embodiment A1, wherein the table indicates a number of orthogonal frequency division multiplex, OFDM, symbols for an RMSI CORESET.

Embodiment A5. The network node of Embodiment A1, wherein the table indicates a window size for searching a physical downlink control channel, PDCCH, which schedules a physical downlink shared channel, PDSCH, which carries the RMSI.

Embodiment A6. The network node of Embodiment A1, wherein the table indicates an offset between a position of a synchronization signal, SS/PBCH block and a position of an RMSI physical downlink control channel, PDDCH, monitoring window.

Embodiment B1. A communication system including a host computer, the host computer comprising:

processing circuitry configured to provide user data; and a communication interface configured to forward the user data to a cellular network for transmission to a wireless device (WD), the cellular network comprising a network node having a radio interface and processing circuitry, the network node's processing circuitry configured to:

determine a remaining minimum system information, RMSI, configuration based on a table of assumptions used to determine a number of bits to represent the RMSI configuration; and broadcast the RMSI configuration using the determined number of bits via a physical broadcast channel, PBCH.

Embodiment B2. The communication system of Embodiment B1, further including the network node.

Embodiment B3. The communication system of Embodiment B2, further including the WD, wherein the WD is configured to communicate with the network node.

Embodiment B4. The communication system of Embodiment B3, wherein:

the processing circuitry of the host computer is configured to execute a host application, thereby providing the user data; and the WD comprises processing circuitry configured to execute a client application associated with the host application.

Embodiment C1. A method implemented in a network node, the method comprising:

determining a remaining minimum system information, RMSI, configuration based on a table of assumptions used to determine a number of bits to represent the RMSI configuration; and broadcasting the RMSI configuration using the determined number of bits via a physical broadcast channel, PBCH.

Embodiment C2. The method of Embodiment C1, wherein the table indicates a frequency position of the RMSI relative to a corresponding synchronization signal, SS/PBCH block.

Embodiment C3. The method of Embodiment C1, wherein the table indicates a duration of a slot used to transmit the RMSI.

Embodiment C4. The method of Embodiment C1, wherein the table indicates a number of orthogonal frequency division multiplex, OFDM, symbols for an RMSI CORESET.

Embodiment C5. The method of Embodiment C1, wherein the table indicates a window size for searching a physical downlink control channel, PDCCH, which schedules a physical downlink shared channel, PDSCH, which carries the RMSI.

Embodiment C6. The method of Embodiment C1, wherein the table indicates an offset between a position of a synchronization signal, SS/PBCH block and a position of an RMSI physical downlink control channel, PDDCH, monitoring window.

Embodiment D1. A method implemented in a communication system including a host computer, a network node and a wireless device (WD), the method comprising:
at the host computer, providing user data; and
at the host computer, initiating a transmission carrying the user data to the WD via a cellular network comprising the network node, the network node being configured to:
determine a remaining minimum system information, RMSI, configuration based on a table of assumptions used to determine a number of bits to represent the RMSI configuration; and
broadcast the RMSI configuration using the determined number of bits via a physical broadcast channel, PBCH.

Embodiment D2. The method of Embodiment D1, further comprising, at the network node, transmitting the user data.

Embodiment D3. The method of Embodiment D2, wherein the user data is provided at the host computer by executing a host application, the method further comprising, at the WD, executing a client application associated with the host application.

Embodiment E1. A wireless device (WD) configured to communicate with a network node, the WD comprising a radio interface and processing circuitry configured to
receive a remaining minimum system information, RMSI, configuration on a physical broadcast channel, PBCH; and
decode the PBCH to determine the RMSI configuration using a number of bits of the PBCH, the number of bits being determined based on a table of assumptions stored at the network node.

Embodiment E2. The WD of Embodiment E1, wherein the determined number of bits of the PBCH is eight.

Embodiment F1. A communication system including a host computer, the host computer comprising:
processing circuitry configured to provide user data; and
a communication interface configured to forward user data to a cellular network for transmission to a wireless device (WD),
the WD comprising a radio interface and processing circuitry, the WD having a radio interface and processing circuitry, the WD's processing circuitry configured to:
receive a remaining minimum system information, RMSI, configuration on a physical broadcast channel, PBCH; and
decode the PBCH to determine the RMSI configuration using a number of bits of the PBCH, the number of bits being determined based on a table of assumptions stored at the network node.

Embodiment F2. The communication system of Embodiment F1, further including the WD.

Embodiment F3. The communication system of Embodiment F2, wherein the cellular network further includes a network node configured to communicate with the WD.

Embodiment F4. The communication system of Embodiment F2 or F3, wherein:
the processing circuitry of the host computer is configured to execute a host application, thereby providing the user data; and
the WD's processing circuitry is configured to execute a client application associated with the host application.

Embodiment G1. A method implemented in a wireless device (WD), the method comprising:
receiving a remaining minimum system information, RMSI, configuration on a physical broadcast channel, PBCH; and
decode the PBCH to determine the RMSI configuration using a number of bits of the PBCH, the number of bits being determined based on a table of assumptions stored at the network node.

Embodiment G2. The method of Embodiment G1, wherein the determined number of bits of the PBCH is eight.

Embodiment H1. A method implemented in a communication system including a host computer, a network node and a wireless device (WD), the method comprising:
at the host computer, providing user data; and
at the host computer, initiating a transmission carrying the user data to the WD via a cellular network comprising the network node, the WD configured to:
receive a remaining minimum system information, RMSI, configuration on a physical broadcast channel, PBCH; and
decode the PBCH to determine the RMSI configuration using a number of bits of the PBCH, the number of bits being determined based on a table of assumptions stored at the network node.

Embodiment H2. The method of Embodiment H1, further comprising, at the WD, receiving the user data from the network node.

Embodiment I1. A network node, comprising:
a memory module configured to store a table of assumptions;
a remaining minimum system information, RMSI, configuration determination module configured to determine a remaining minimum system information, RMSI, configuration based on a table of assumptions used to determine a number of bits to represent the RMSI configuration; and
a radio interface module configured to broadcast the RMSI configuration using the determined number of bits via a physical broadcast channel, PBCH.

Embodiment I2. A wireless device, comprising:
a memory module configured to store a remaining minimum system information, RMSI, configuration;
a radio interface module configured to receive the RMSI configuration on a physical broadcast channel, PBCH; and
an RMSI configuration determination module configured to decode the PBCH to determine the RMSI configuration using a number of bits of the PBCH, the number of bits being determined based on a table of assumptions stored at the network node.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
DMRS Demodulation Reference Signal
FDM Frequency Division Multiplexing
MIB Master Information Block
NR New Radio
OFDM Orthogonal Frequency Division Multiplexing
OS OFDM Symbol
PBCH Physical Broadcast Channel
PDCCH Physical Downlink Control Channel
RMSI Remaining Minimum System Information
SCS Subcarrier Spacing
SSB Synchronization Signal Block, also known as SS/PBCH block
SS/PBCH Synchronization Signal and PBCH (including DMRS of PBCH)

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device (WD), the method comprising:
   receiving a physical broadcast channel (PBCH);
   decoding the PBCH; and
   determining a remaining minimum system information (RMSI) configuration based on a number of bits of the PBCH.

2. The method of claim 1, wherein a determined number of bits of the PBCH is eight.

3. The method of claim 1, wherein the WD assumes that an RMSI control resource set (CORESET) monitoring window corresponding to a synchronization signal/physical broadcast channel (SS/PBCH) block in a radio frame satisfies a condition that modulo equals zero or one.

4. The method of claim 1, wherein the WD is configured to expect an RMSI Control Resource Set (CORSET) to begin within 20 ms starting from a first subframe of a synchronization signal burst set in which a corresponding synchronization signal/physical broadcast channel (SS/PBCH) block is transmitted.

5. The method of claim 4, wherein, when there are further retransmissions in subsequent 20 ms periods, the WD is configured to expect that the RMSI CORESET is in a same position as in a first transmission.

6. The method of claim 1, wherein the WD is configured to expect an RMSI Control Resource Set (CORESET) time duration to be 1, 2 or 3 symbols long, wherein the WD finds the RMSI configuration using blind detection within 2 milli-seconds.

7. The method of claim 1, wherein, when a mini-slot is configured, after a first RMSI configuration is correctly decoded, the WD omits to search positions occupied by synchronization signal/physical broadcast channel (SS/PBCH) blocks actually transmitted when searching for subsequent RMSI configurations.

8. A wireless device, WD, configured to communicate with a network node, the WD comprising:
a radio interface configured to receive a physical broadcast channel (PBCH) and processing circuitry configured to:
decode the PBCH; and
determine a remaining minimum system information (RMSI) configuration based on a number of bits of the PBCH.

9. The WD of claim 8, wherein a determined number of bits of the PBCH is eight.

10. The WD of claim 8, wherein the WD assumes that an RMSI control resource set (CORESET) monitoring window corresponding to a synchronization signal/physical broadcast channel (SS/PBCH) block in a radio frame satisfies a condition that modulo equals zero or one.

11. The WD of claim 8, wherein the WD is configured to expect an RMSI Control Resource Set (CORSET) to begin within 20 ms starting from a first subframe of a synchronization signal burst set in which a corresponding synchronization signal/physical broadcast channel (SS/PBCH) block is transmitted.

12. The WD of claim 11, wherein, when there are further retransmissions in subsequent 20 ms periods, the WD is configured to expect that the RMSI CORESET is in a same position as in a first transmission.

13. The WD of claim 8, wherein the WD is configured to expect an RMSI Control Resource Set (CORESET) time duration to be 1, 2 or 3 symbols long, and/or wherein the WD finds the RMSI configuration using blind detection within 2 milli-seconds.

14. The WD of claim 8, wherein, when a mini-slot is configured, after a first RMSI configuration is correctly decoded, the WD omits to search positions occupied by synchronization signal/physical broadcast channel (SS/PBCH) blocks actually transmitted when searching for subsequent RMSI configurations.

15. A network node configured to broadcast a configuration of a remaining minimum system information (RMSI) data set on a physical broadcast channel (PBCH) the network node comprising:
processing circuitry configured to determine an RMSI configuration based on a set of assumptions used to determine a number of bits to represent the RMSI configuration; and
a radio interface configured to broadcast the RMSI configuration using the determined number of bits via the PBCH.

16. The network node of claim 15, wherein the set of assumptions includes:
an assumption that an RMSI control resource set (CORSET) bandwidth is one of fixed and limited to two sizes,
an assumption that an RMSI control resource set (CORESET) is always started within a restricted time duration starting from a first subframe of a synchronization signal (SS) burst set in which a corresponding synchronization signal/physical broadcast channel (SS/PBCH) block is transmitted,
an assumption that when an RMSI control resource set (CORESET) and synchronization signal/physical broadcast channel (SS/PBCH) are time multiplexed, they share a same frequency, and/or
an assumption concerning mapping of orthogonal frequency division multiplexing (OFDM) symbol positions for a synchronization signal/physical broadcast channel (SS/PBCH) block, a mapping method being the same when subcarrier spacing is one of 60 kHz and 120 kHz.

17. The network node of claim 15, wherein, when an RMSI control resource set (CORESET) and synchronization signal/physical broadcast channel (SS/PBCH) block are frequency multiplexed, the set of assumptions include that:
the RMSI CORESET and a scheduled physical downlink shared channel (PDSCH) carrying RMSI are in a time duration of 2, 4 or 7 OFDM symbols using RMSI numerology starting from a beginning of an associated SS/PBCH block;
the RMSI CORESET and SS/PBCH block have different frequency positions and a monitoring window offset is 0; and
a frequency position of the RMSI CORESET is limited to be positioned to a set of fixed positions in relation to the frequency position of the associated SS/PBCH block.

18. The network node of claim 15, wherein the set of assumptions includes an assumption that an RMSI control resource set (CORSET) is defined in an RMSI configuration table containing a NULL value indicating that no RMSI is transmitted in association with a particular synchronization signal/physical broadcast channel (SS/PBCH) block.

19. The network node of claim 15, wherein the set of assumptions includes an assumption that further transmissions of the RMSI configuration follow in 20 ms periods following a first transmission of the RMSI configuration.

20. The network node of claim 15, wherein the RMSI configuration is stored in two four bit sets, and/or wherein a time duration of an RMSI control resource set (CORESET) is within one of one, two and three symbols.

* * * * *